May 26, 1953 H. W. LINDSAY 2,639,867

TAPE REEL MOUNTING

Filed March 21, 1949

INVENTOR,
HAROLD W. LINDSAY.
BY Donald K. Lippincott
ATTORNEY.

Patented May 26, 1953

UNITED STATES PATENT OFFICE 2,639,867

TAPE REEL MOUNTING

Harold W. Lindsay, Redwood City, Calif., assignor to Ampex Electric Corporation, San Carlos, Calif., a corporation of California Application March 21, 1949, Serial No. 82,694

3 Claims. (Cl. 242—55)

Figures 1, 2:
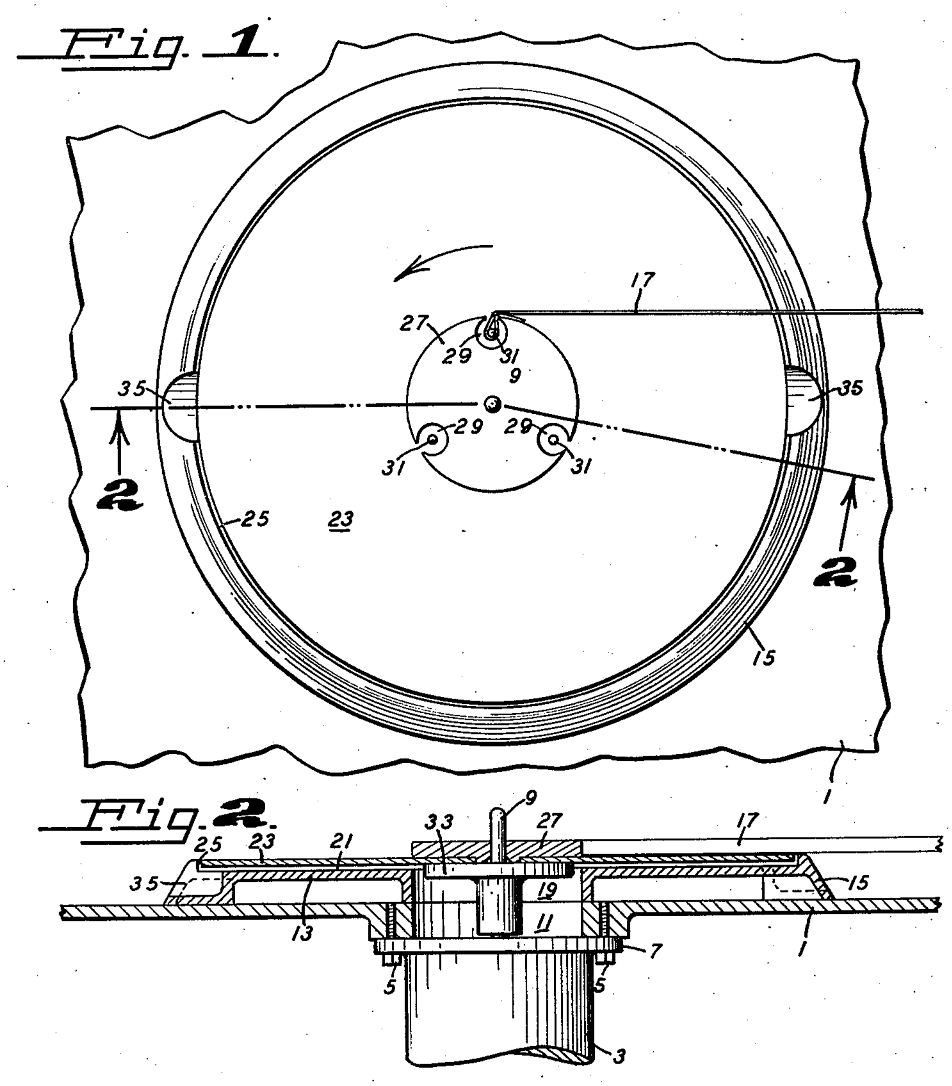

This invention relates to mountings for tape reels such as are used to hold and either pay off or take up tapes of various characters, such as photographic films, or, more particularly, paper or plastic tapes such as are used for magnetic phonographic recordings.

In order to get a maximum length of recording with minimum bulk and weight the tapes that are made for this purpose are narrow—about a quarter of an inch wide—and are but a few thousandths of an inch thick. They are customarily made of plastic such as cellulose acetate or reconstructed cellulose, which is tough and elastic, and are coated on one side with various types of iron oxides. They are resilient, and they have a powerful tendency to curl, so that when they are allowed to become slack, or if they become unwound from the reels on which they are stored, they tend to kink and snarl badly, and, in spite of the toughness of the material of which they are made, to break. If there is any part of the mechanism with which they are utilized which they can possibly get under or catch upon they will almost inevitably do so.

The reels upon which such tapes are mounted comprise a central drum or core which may be either singly or doubly flanged. Where flanges are provided on both sides of the reel there is, of course, less danger of the outer turns slipping off of the inner ones and tangling hopelessly, and the double flange reels are therefore to be preferred if the reels are to be handled much or are to be shipped. In general, however, the single flange reels are preferable; the entire roll of tape is open for inspection, the single flange can be made heavier than is practicable with the dual flanges, and there is less likelihood of the flange becoming bent or of some extraneous object becoming jammed between the flanges which will cause damage to or breakage of the tape. In addition, where a recording must be edited or cut, the splices sometimes exceed the normal width of the tape. This causes no harm on the single flange reel, but may catch between flanges on both sides of the roll, and therefore, in spite of the fact that the single flange reels must be handled more carefully, they are, in general, preferable.

In use, the tape reels must rotate freely, and there must therefore be clearance between them and the table or support surface on which they are mounted. It is almost impossible, under production conditions, to have such tables absolutely level. The tape must therefore have some clearance above the surface, and this is also advisable because it permits the tape to be grasped more readily when changing reels and threading the tape through the recording or reproducer heads of the machine. Mounting the reels above the table, however, offers an additional hazard of the tape catching and snarling when threading or when it is, for any reason, slackened.

With the above facts in view, among the objects of my invention are to provide a mounting for tape reels having no projections on which the tape will catch, which will hold the tape clear of its supporting surface, and which will, at the same time, permit a reel when mounted thereon to be readily picked up or replaced with minimum effort and in minimum time.

Other objects and advantages of my invention will appear in connection with the following description taken in conjunction with the accompanying drawings wherein Fig. 1 is a plan view of the mounting of my invention with a tape reel in place thereon and Fig. 2 is a cross sectional view thereof, the plane of section being along the line 2, 2 of Fig. 1.

Considering the figures the mounting surface or table 1 may be of wood, metal, or plastic, and will usually be the upper surface of a cabinet or console housing the elements of the recording or reproducing mechanism. In the present instance a drive or tensioning motor 3 is mounted by means of screws 5 projecting through a flange 7 to the under side of the table 1. The vertical shaft 9 of the motor projects through an aperture 11 in the support surface.

Mounted on the top of the table 1, concentric with the shaft, is a pedestal 13. This pedestal is in the form of a frusto-conical disk or plate, its sides 15 slanting upward and inward to provide a surface which will naturally slide the tape 17 toward the top of the pedestal. The disk is provided with a central aperture 19 which is substantially a continuation of the aperture 11, and the pedestal is provided with a circular recess 21 in its upper surface which is so dimensioned as to give easy clearance to the flange 23 of the tape reel when it is mounted therein and to permit the reel to rotate freely without rubbing on any part of the pedestal. The clearance at the edge of the reel flange 23 should, however, be no greater than is required to prevent friction, so that there will be no tendency for the tape to catch in it, the dimensions of the gap between the rim of the pedestal and the flange as shown at the reference character 25 in the drawings being of about the right proportions.

The tape reel shown is that described in my co-pending application Serial No. 82,691 filed concurrently with this application. It comprises the circular flange or disk 23, which is preferably of aluminum or magnesium, these materials being light enough so that the flange can be given a very considerable rigidity without excess weight. Mounted in the center of the flange is a coaxial drum 27 upon which the tape is wound, and near the periphery of the drum there are formed apertures 29 parallel with the axis and intersecting the periphery in narrow slots. Located centrally of the apertures 29 are smaller apertures through which drive pins 31 project when the reel is in use.

The drive pins are mounted in the upper surface of a flange 33 which is mounted on the shaft 9, the upper surface of the flange being depressed below the top of the pedestal 15 by just the thickness of the disk or flange 23. When the reel is in place, therefore, the upper surface of flange 23 appears as a continuation of the top of the pedestal 15, only the small clearance gap 25 interrupting the smooth surface.

Formed in each side of the pedestal is a recess 35, wide enough to receive one or two fingers and extending under the edge of the flange 23 when the latter is in place. This permits the reels to be readily lifted off of the drive shaft and hub when removing or replacing them.

As described in the co-pending application above referred to, the construction of the drum, in connection with the drive pins 31, permits the tape 17 to be looped over the pin, as shown in Fig. 1, locking the end of the tape securely to the drum as soon as the latter is rotated so that the standing end of the tape approaches the tangential position, and at the same time to release the tape instantly when the pressure of the standing end against the free end of the loop is liberated by the rotation of the reel.

I have found by experience that the mounting here described and claimed permits reels to be changed quickly and easily, and that it is practically impossible for the tape to foul on any portion of the mechanism, thus giving less trouble than any other type of mounting with which I am familiar. During normal operation the tape remains taut and is held clear of the pedestal 15. However, when a condition of slack appears, a portion of the tape may drop down upon the upper surface of the panel 1, and thus disengage itself from the reel. When tension is restored to the tape, that portion which dropped down upon the panel 1 is drawn upwardly over the frusto-conical surface of the pedestal to properly re-engage the reel.

It will be understood that various modifications can be made in the structure as shown within the scope of the following claims.

I claim:

1. In combination with a removable message tape storage reel having a cylindrical hub of a height approximating the width of a resilient tape adapted to be wrapped thereabout and tape guiding means extending outwardly from at least one end of the hub to align a reel- and hub-supported tape so that at least one tape edge is located substantially in the same plane, a base panel member, a pedestal supported from the base panel member, said pedestal having an outer surface of substantially frusto-conical shape with the cone base faced toward the base panel, said pedestal having a circular recess extending inwardly from the plane of smaller cone diameter for at least a portion of the pedestal height and extending completely through the pedestal to form an aperture therethrough in at least the central portion thereof, a tape storage reel locating element positioned substantially centrally of the pedestal in the area of the said pedestal aperture and extending from the region of the pedestal base toward its top to a plane located below the top in such position that an adjacently placed tape supporting reel will have the tape guiding means substantially at the plane of the pedestal top, and means operative to drive the tape storage reel locating element and any tape storage reel located thereby so that at times of tape winding and unwinding from the reel the so-carried tape is clear from the base panel member when in a generally taut state and, upon tension reduction, the tape is adapted to contact the generally frusto-conical surface of the pedestal to cause the tape to draw to a position clear of the base panel member with a restoration of tape tension.

2. The tape reel mounting combination claimed in claim 1 wherein said pedestal is provided with one or more finger recesses extending inwardly of the frusto-conical surface to facilitate removal of the tape holding reel adapted to be positioned for rotation relative to the pedestal.

3. In combination with a removable message tape storage reel having a cylindrical hub of a height approximating the width of the resilient tape adapted to be wrapped about the same, and having at least one circularly contoured guide member of a diameter substantially greater than the hub and concentrically secured to the hub, whereby at least one edge of a tape wrapped upon the reel is located in the plane of that side of the guide member which is faced toward the hub; an upwardly faced panel member, an upwardly extending pedestal supported on the panel member, said pedestal having an outer peripheral surface of substantially frusto-conical shape with the larger end of the pedestal located adjacent the panel, said pedestal having a circular recess extending downwardly from the plane of its upper end for at least a portion of the pedestal height, said recess being slightly smaller in diameter than the diameter of the upper end of the pedestal and slightly greater in diameter than the diameter of said guide member, rotatable reel engaging means located centrally of the pedestal for making detachable drive connection with the reel, said means serving to locate the reel with the guide member of the reel concentrically disposed in said recess, with the upper surface of said guide member in a plane substantially coincident with the plane of the upper end of the pedestal, and means serving to operatively drive said reel engaging means and any reel engaged thereby so that at times of tape winding and unwinding from the reel the tape is clear from the pedestal and base panel member when in generally taut state and, so that when tension is restored after tension reduction and a condition of tape slack, any length of tape which has loosened and dropped to the panel during the condition of slack is drawn upwardly over said frusto-conical surface of the pedestal to re-engage the reel.

HAROLD W. LINDSAY.

(References on following page)

References Cited in the file of this patent

UNITED STATES PATENTS

| Number | Name | Date |
|---|---|---|
| 325,655 | Carlson | Sept. 8, 1885 |
| 370,716 | Smith | Sept. 27, 1887 |
| 431,794 | Anderson | July 8, 1890 |
| 873,071 | Nixon | Dec. 10, 1907 |
| 1,237,496 | Fankhauser et al. | Aug. 21, 1917 |
| 1,328,696 | Smith | Jan. 20, 1920 |
| 1,334,690 | Davis | Mar. 23, 1920 |
| 1,436,790 | Bowman | Nov. 28, 1922 |
| 1,455,110 | Crawley | May 15, 1923 |
| 1,503,896 | Harris | Aug. 5, 1924 |
| 1,637,437 | Case | Aug. 2, 1927 |
| 1,669,248 | Joyce | May 8, 1928 |
| 2,051,259 | James | Aug. 18, 1936 |
| 2,350,549 | Eslinger | June 6, 1944 |
| 2,507,457 | Rix | May 9, 1950 |

FOREIGN PATENTS

| Number | Country | Date |
|---|---|---|
| 482,536 | Great Britain | of 1938 |